(12) United States Patent
Yamamoto et al.

(10) Patent No.: US 11,073,624 B2
(45) Date of Patent: Jul. 27, 2021

(54) RADIOGRAPHIC IMAGING APPARATUS

(71) Applicant: Konica Minolta, Inc., Tokyo (JP)

(72) Inventors: Yoshito Yamamoto, Higashimurayama (JP); Kazuya Ikeda, Higashiyamato (JP); Yasuhito Kuwahara, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/839,604

(22) Filed: Apr. 3, 2020

(65) Prior Publication Data

US 2020/0319354 A1 Oct. 8, 2020

(30) Foreign Application Priority Data

Apr. 3, 2019 (JP) .............................. JP2019-071428

(51) Int. Cl.
*G01T 1/20* (2006.01)

(52) U.S. Cl.
CPC ................... *G01T 1/2006* (2013.01)

(58) Field of Classification Search
CPC .............................. G01T 1/2006; G01T 1/202
See application file for complete search history.

(56) References Cited

U.S. PATENT DOCUMENTS

| 9,513,380 | B2 | 12/2016 | Liu | |
|---|---|---|---|---|
| 2004/0016886 | A1* | 1/2004 | Ringermacher | H01L 27/14601 250/370.11 |
| 2012/0068074 | A1* | 3/2012 | Arimoto | G21K 4/00 250/361 R |
| 2014/0374608 | A1* | 12/2014 | Sasaki | H01L 27/14632 250/366 |
| 2015/0204986 | A1* | 7/2015 | Nariyuki | A61B 6/4283 250/369 |
| 2016/0027847 | A1* | 1/2016 | Liu | G01T 1/2018 378/62 |

FOREIGN PATENT DOCUMENTS

JP 2018179510 A * 11/2018

* cited by examiner

*Primary Examiner* — Kiho Kim
(74) *Attorney, Agent, or Firm* — Cantor Colburn LLP

(57) ABSTRACT

A radiographic imaging apparatus, includes: a planar-shaped flexible scintillator board that emits light at an intensity according to a radiation dose of received radiation; a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface.

18 Claims, 6 Drawing Sheets

RADIOGRAPHIC IMAGING APPARATUS

CROSS-REFERENCE TO RELATED APPLICATIONS

The present invention claims priority under 35 U.S.C. § 119 to Japanese Patent Application No. 2019-071428 filed on Apr. 3, 2019, the entire content of which is incorporated herein by reference.

BACKGROUND

Technological Field

The present invention relates to a radiographic imaging apparatus.

Description of the Related Art

Many of digital radiographic imaging apparatuses convert received radiation into light through a scintillator, cause charges according to the amount of light through a photodetection element, and generate a radiograph based on the caused amount of charges.

Unfortunately, some of luminescent materials contained in the scintillator are deliquescent. In a case of using such deliquescent luminescent materials for the scintillator, the scintillator is covered with a moisture barrier layer that blocks moisture.

In recent years, for the sake of improving the impact resistance of a radiographic imaging apparatus, a flexible material made of a resin is adopted as a substrate where photodetection elements are formed.

The substrate made of a resin has characteristics of having higher air and moisture permeability than those of a conventional rigid substrate. Meanwhile, a typical photodetection element is made of an organic material, and has characteristics susceptible to moisture and oxygen. Accordingly, by adopting a resin as a substrate, the photodetection elements formed on the substrate are affected by moisture and oxygen, which newly causes a problem in that the image quality of a radiograph is reduced.

Accordingly, for example, as described in U.S. Pat. No. 9,513,380, a technique has been proposed that a lamination of a substrate made of a resin and a scintillator is circumferentially covered with a metal film to block the substrate and the scintillator against the ambient air.

A radiographic imaging apparatus including a substrate formed of a flexible material has a possibility that the substrate is warped by, for example, reasons that a user carrying the apparatus erroneously drops the apparatus, which collides with the floor, that the apparatus is subjected to the load of a test subject laid thereon and the housing is warped during decubitus radiographing, and that a long duration of radiographing increases the inner temperature to thermally expand each element.

Unfortunately, the conventional radiographic imaging apparatus as described in U.S. Pat. No. 9,513,380 has a possibility that if the substrate is warped owing to usage, wrinkles are caused on at least any of the moisture barrier layer, the scintillator and the substrate, and that at least any of pairs of the moisture barrier layer and scintillator, of the moisture barrier layer and the substrate, and of the scintillator and the substrate are separated from each other.

The wrinkles are possibly taken in a radiograph. The separation allows moisture and air to enter the inside. As a result, the image quality of the radiograph is reduced.

SUMMARY

The present invention has been made in view of the problem described above, and has an object to prevent wrinkles from occurring and the elements from being separated even if the substrate is warped owing to usage, in a radiographic imaging apparatus that includes a scintillator, a flexible substrate including photodetection elements, and a moisture barrier layer covering them.

To achieve at least one of the abovementioned objects, according to an aspect of the present invention, a radiographic imaging apparatus reflecting one aspect of the present invention comprises:

a planar-shaped flexible scintillator board that emits light at an intensity according to a radiation dose of received radiation; a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION OF THE EMBODIMENTS

Figure 1:
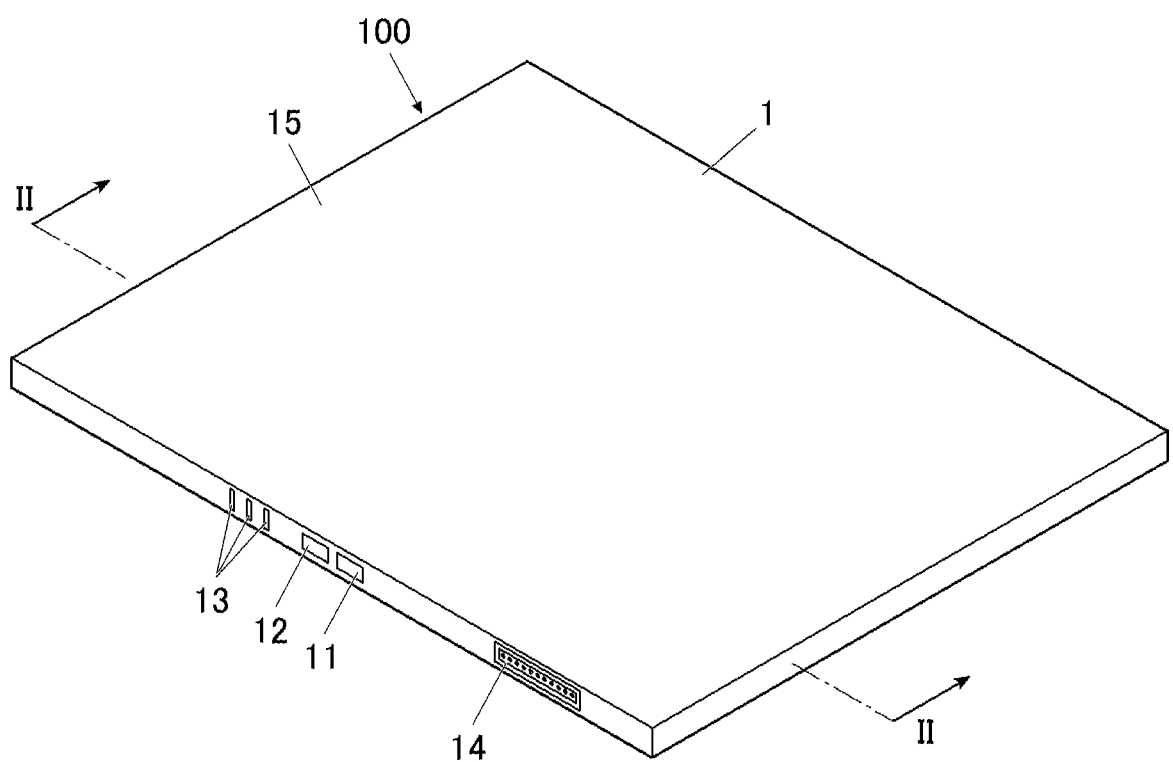
FIG. 1 is a perspective view of a radiographic imaging apparatus according to a first and second embodiment of the present invention.

Hereinafter, one or more embodiments of the present invention will be described with reference to the drawings. However, the scope of the invention is not limited to the disclosed embodiments.

First Embodiment

A first embodiment of the present invention is hereinafter described with reference to the drawings. However, the present invention is not limited to those shown in the drawings.

[Configuration of Radiographic Imaging Apparatus]

Figure 2:
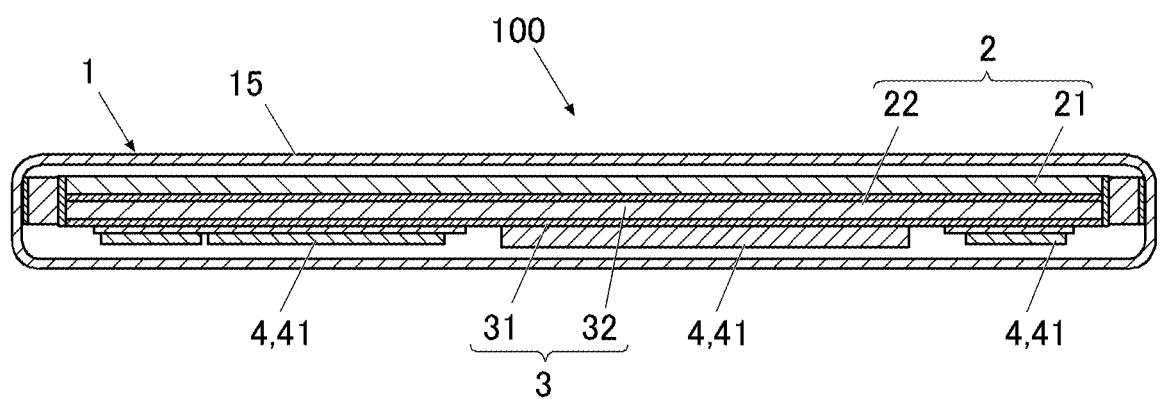
FIG. 2 is a sectional view taken along line II-II of FIG. 1.
Figure 3:
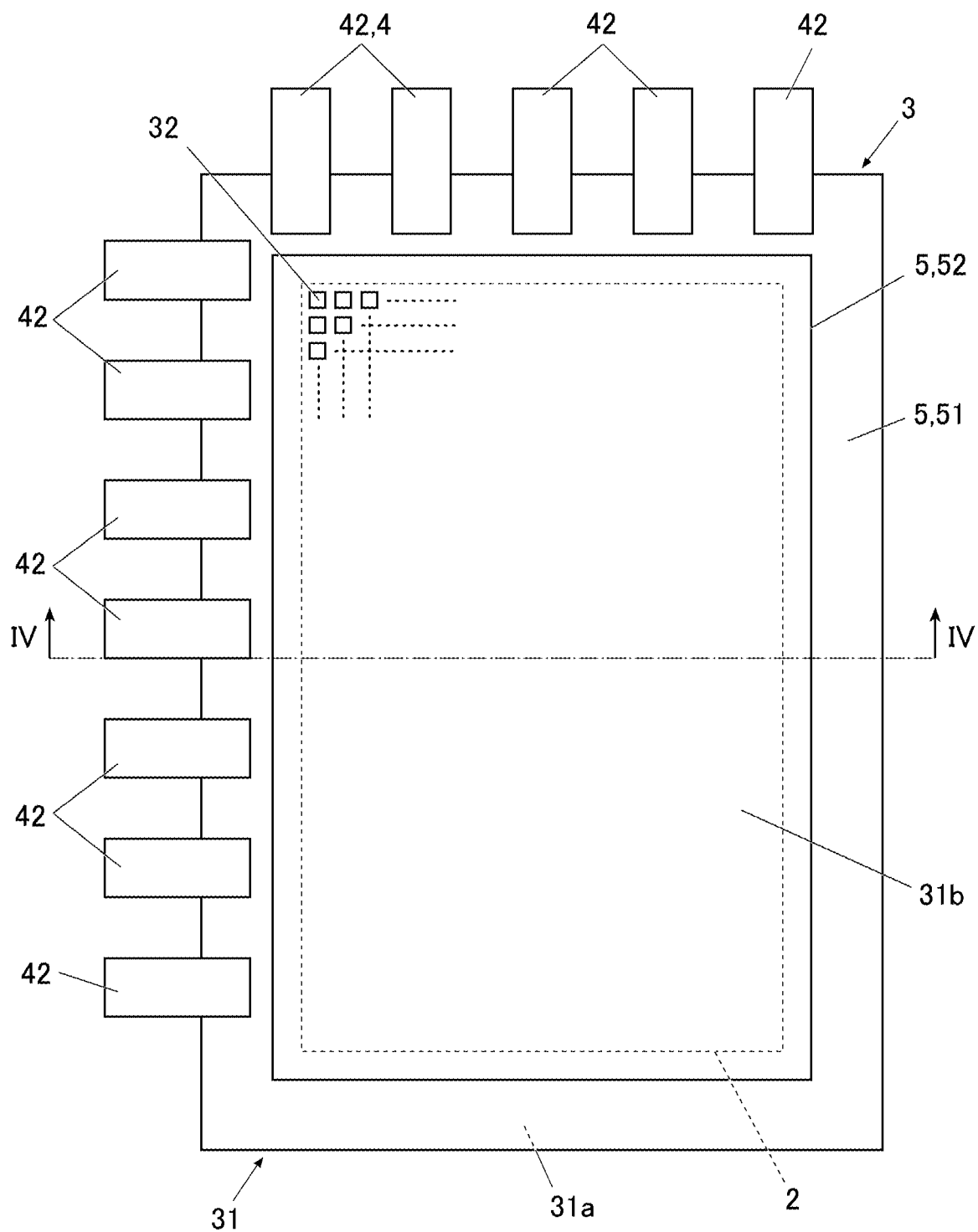
FIG. 3 is a plan view of a partial configuration that the radiographic imaging apparatus in FIG. 1 has.
Figure 4:
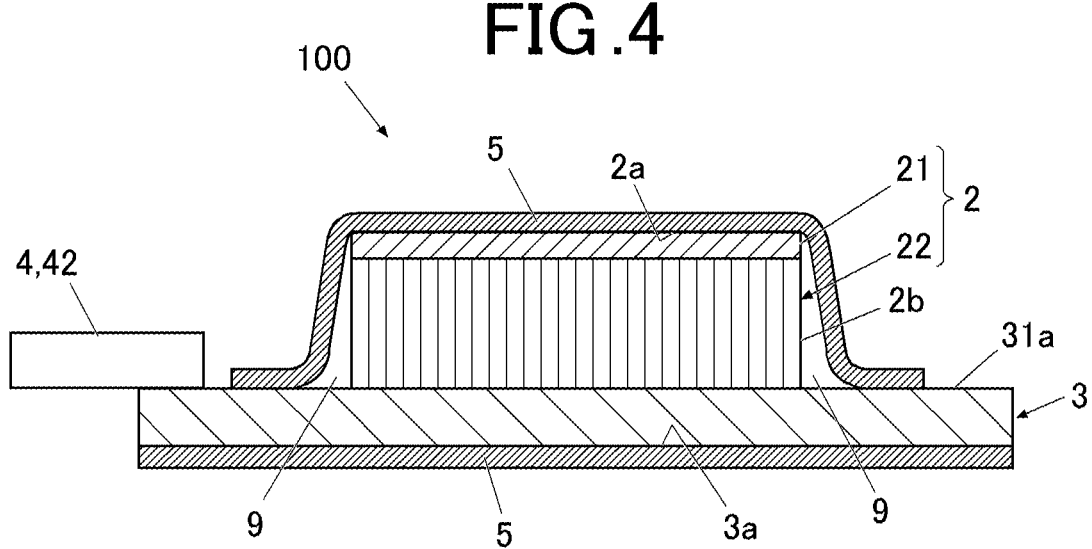
FIG. 4 is a sectional view taken along line IV-IV of FIG. 3.

First, a schematic configuration of a radiographic imaging apparatus 100 is described. FIG. 1 is a perspective view of the radiographic imaging apparatus 100. FIG. 2 is a sectional view taken along line II-II of FIG. 1. FIG. 3 is a plan view of a partial configuration that the radiographic imaging apparatus 100 has. FIG. 4 is a sectional view taken along line IV-IV of FIG. 3.

Note that FIG. 1 shows an example of the portable panel-shaped radiographic imaging apparatus 100. However, the present invention is applicable also to radiographic imaging apparatuses having other forms (for example, a fixed installation type formed integrally with a radiographing stage or the like).

For example, as shown in FIGS. 1 to 4, the radiographic imaging apparatus 100 according to this embodiment includes not only a housing 1, but also a scintillator board 2, a photoelectric conversion panel 3, a control board 4 and a moisture barrier layer 5, which are accommodated in the housing 1.

As shown in FIG. 1, a power source switch 11, an operation switch 12, an indicator 13, a connector 14 and the like are provided on a side surface of the housing 1.

One of the surfaces that the housing 1 has serves as a radiation incident surface 15.

As shown in FIG. 2 and FIG. 4, the scintillator board 2 according to this embodiment includes a support layer 21, and a phosphor layer 22.

The support layer 21 according to this embodiment is formed of a flexible material in a film shape (thin planar shape).

Specific examples of the flexible material include, for example, polyethylene naphthalate, polyethylene terephthalate (PET), polycarbonate, polyimide, polyamide, polyetherimide, aramid, polysulfone, polyether sulfone, fluororesin, polytetrafluoroethylene (PTFE), or a composite material thereof.

In particular, among the materials described above, polyimide, polyamide, polyetherimide, PTFE, or a composite material thereof is preferable in view of improving the heat resistance.

The support layer 21 according to this embodiment is formed to be rectangle.

The phosphor layer 22 is formed of phosphors on a surface of the support layer 21.

In the present invention, the phosphors are phosphors whose atoms are excited by being irradiated with ionizing radiation, such as alpha rays, gamma rays and X-rays, to emit light. That is, they indicate phosphors that convert radiation into ultraviolet or visible light and emit the light. Phosphors are not specifically limited only if they are material that can efficiently convert, into light, radiant energy such as of X-rays having entered from the outside.

For example, a material capable of converting radiation, such as X-rays, into those having different wavelength, such as visible light, can be appropriately used as phosphors according to the present invention. Specifically, scintillators and phosphors described in a part pp. 284 to 299 of "keikotai handobukku (phosphor handbook)" (Phosphor Research Society ed., Ohmsha, 1987), and materials described on a website of U.S. Lawrence Berkeley National Laboratory, "Scintillation Properties (http://scintillator.lbl.gov/)," can be considered. However, materials that are not described here can also be adopted as phosphors only if "they are materials capable of converting radiation, such as X-rays, into what has a different wavelength, such as visible light". Furthermore, to achieve reduction in persistence, a scintillator where semiconductor nano particles, such as of $CsPbCl_3$, are contained in a monocrystal scintillator, such as CsCl:Pb, or hybrid organic-inorganic perovskite compound formed of an organic compound, such as alkylamine, and an inorganic compound, such as $PbBr_2$, may be adopted. To achieve high sensitivity, inorganic perovskite nanocrystal, such as lead halide, may be adopted. In the present invention, typically, the scintillator layer is made of a phosphor parent compound and an activator agent. The scintillator layer may be made of phosphor columnar crystals formed by a vapor phase deposition method, or may be a layer made by applying phosphor particle dispersion to deposit the particles.

The phosphor layer 22 according to this embodiment is formed on the entire surface of the support layer 21, the surface facing the photoelectric conversion panel 3. That is, the scintillator board 2 is formed to be rectangular.

The phosphor layer 22 according to this embodiment has a thickness capable of being warped (elastically deformed) as the support layer 21 is warped.

The phosphor layer 22 has an entirely uniform thickness including the periphery. Specifically, the variation coefficient calculated from thicknesses obtained at the respective points on the phosphor layer 22 is equal to or less than 30%.

Accordingly, the phosphor layer 22 according to this embodiment has a luminescent performance at the periphery similar to that at the center part. Consequently, a signal value based on charges generated by the photodetection element that faces the periphery is also correct. Accordingly, a large effective image area can be secured.

The scintillator board 2 configured as described above emits light at an intensity according to the received radiation dose and is formed to have a flexible planar shape.

As shown in FIG. 2, as for the scintillator board 2, the support layer 21 is disposed between the radiation incident surface 15 of the housing 1 and the phosphor layer 22.

The scintillator board 2 according to this embodiment is arranged so as to extend in parallel with the radiation incident surface 15 of the housing 1.

As shown in FIGS. 2 and 3, the photoelectric conversion panel 3 includes a support board 31, and multiple photodetection elements 32.

The photoelectric conversion panel 3 according to this embodiment includes multiple scanlines, multiple signal lines, multiple switch elements, and multiple bias lines, which are not shown.

The support board 31 according to this embodiment is formed of a flexible material into a film shape (thin planar shape). In this embodiment, this board is made of the same material as that of the support layer 21 of the scintillator board 2. That is, the support board 31 according to this embodiment has flexibility, and has a thermal expansion rate and a thermal contraction rate that are identical to the thermal expansion rate and the thermal contraction rate of the support layer 21. Accordingly, when the photoelectric conversion panel 3 thermally expands, the scintillator board 2 also thermally expands together. Consequently, the laminated body of the photoelectric conversion panel 3 and the scintillator board 2 is resistant to being warped. As a result, certain light emitting positions on the scintillator board 2 and the photodetection elements 32 facing the positions do not deviate from each other, which can prevent the image quality of a radiograph from being degraded.

Note that the support board 31 may be formed of a material that has the same thermal expansion rate and thermal contraction rate as the support layer 21 has but is different from that of the support layer 21.

As shown in FIG. 3, the support board 31 according to this embodiment is formed to have a rectangular shape slightly larger than the plan-view shape of the scintillator board 2.

The photodetection elements 32 emit an amount of charges according to the intensity of received light.

As shown in FIG. 3, the photodetection elements 32 are formed to be two-dimensionally distributed on a surface of the support board 31.

Hereinafter, the surface of the support board 31 on which the photodetection elements 32 are formed is called an element-formed surface 31a.

The photodetection elements 32 according to this embodiment are arranged at the center part of the element-formed surface 31a in a matrix manner. Specifically, the elements are respectively arranged in rectangular areas (pixels) on the surface of the support board 31; the areas are encircled by multiple scanlines that are formed to extend in parallel with each other at regular intervals but are not shown, and by multiple signal lines that are formed to orthogonal to the scanlines but are not shown.

A switch element, not shown, is provided in each rectangular area. The switch element is made of TFT, for example. The gate of each switch element is connected to the scanline, the source is connected to the signal line, and the drain is connected to the photodetection element.

The areas in which the photodetection elements 32 are formed is a rectangle slightly smaller than the plan-view shape of the scintillator board 2. That is, no photodetection element 32 is formed at the periphery of the element-formed surface 31a.

Hereinafter, the area on the element-formed surface 31a in which the photodetection elements 32 are formed is called an element-formed area 31b.

The photoelectric conversion panel 3 configured as described above has flexibility, and is arranged such that the element-formed surface 31a on which the photodetection elements 32 are formed faces the scintillator board 2, as shown in FIG. 4.

The photoelectric conversion panel 3 according to this embodiment is arranged so as to extend in parallel with the scintillator board 2.

As to the photoelectric conversion panel 3 according to this embodiment, the element-formed area 31b faces the scintillator board 2, as shown in FIG. 3. As described above, the photoelectric conversion panel 3 according to this embodiment has a rectangular shape slightly larger than the plan-view shape of the scintillator board 2. Accordingly, the periphery of the element-formed surface 31a does not face the scintillator board 2.

As shown in FIGS. 2 to 4, the control board 4 includes a main body 41, and wires 42.

As shown in FIG. 2, the main body 41 is disposed on a surface of the photoelectric conversion panel 3 opposite to the surface facing the scintillator board 2.

The main body 41 includes a film-shaped insulation layer, not shown, and various electronic components (a gate driver, a reading circuit, a power source circuit, a CPU controlling these components, and the like, which are not shown) mounted on a surface of the insulation layer.

The wires 42 connect the photodetection elements 32 to various electronic components of the main body 41.

Specifically, the wires connect ends (terminals) of the scanlines on the photoelectric conversion panel 3 to the gate driver, the ends (terminals) of the signal lines to the reading circuit, and the ends (terminals) of the bias lines to the power source circuit.

In this embodiment, as shown in FIG. 3, ends of wires 42 are connected to parts of the periphery of the element-formed surface 31a.

As shown in FIG. 4, the moisture barrier layer 5 covers (blocks) a surface 2a of the scintillator board 2 opposite to the surface facing the photodetection elements 32, a side surface 2b of the scintillator board 2 (a surface oriented in a direction orthogonal to the lamination direction of the support layer 21 and the phosphor layer 22), and a surface 3a of the photoelectric conversion panel 3 opposite to the element-formed surface.

The moisture barrier layer 5 is formed of a material having characteristics of preventing moisture from passing therethrough.

A specific example of the material having characteristics of preventing moisture from passing therethrough may be, for example, at least any of metals (Al, Ag, Cr, Cu, Ni, Ti, Mg, Rh, Pb, Pt, Au, etc.), metal oxides, inorganic materials ($Al_2O_3$, $SiO_2$, ITO (Indium Tin Oxide), SiN, etc.), organic materials (fluororesin, PVA, PVDC, PMAN, PAN, PLGA, parylene, etc.).

If it is assumed that the moisture barrier layer 5 is formed of a material having conductivity, such as a metal or ITO, among the materials described above and is grounded, this assumption is preferable in view of preventing the moisture barrier layer 5 from being charged.

As shown in FIG. 4, the moisture barrier layer 5 according to this embodiment includes a first moisture barrier layer 51, and a second moisture barrier layer 52.

The first moisture barrier layer 51 covers a surface of the photoelectric conversion panel 3 opposite to the element-formed surface 31a.

Figure 5:
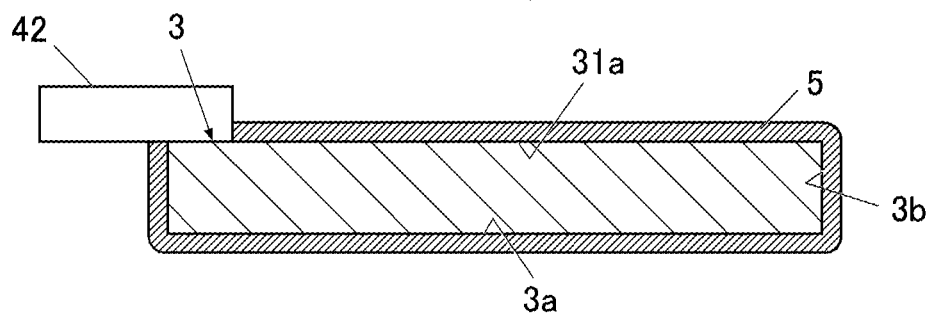
FIG. 5 is a sectional view of a partial configuration that a radiographic imaging apparatus according to a modified example of the first embodiment has.

For example, as shown in FIG. 5, the first moisture barrier layer 51 may further cover the element-formed surface 31a and the side surface 3b of the photoelectric conversion panel 3 (a surface oriented in a direction orthogonal to the lamination direction of the support board 31 and the photodetection elements 32).

In this case, it is assumed that a site of the moisture barrier layer 5 that covers at least the element-formed area 31b is formed of a transparent material, such as $Al_2O_3$, $SiO_2$, fluororesin, PVA, PVDC, PMAN, PAN, PLGA, or parylene, among the materials described above. This assumption is preferable in view of preventing light of the scintillator board 2 from being blocked.

As shown in FIG. 4, the second moisture barrier layer 52 covers the surface 2a of the scintillator board 2 opposite to the surface facing the photodetection elements 32, and the side surface 2b of the scintillator board 2.

The second moisture barrier layer 52 according to this embodiment further covers parts of the periphery of the element-formed surface 31a that are not in contact with the wires.

The moisture barrier layer 5 according to this embodiment is configured as described above, which can block the scintillator board 2 and the photoelectric conversion panel 3 from the ambient air, and can prevent the phosphor layer 22 from absorbing moisture and deliquescing and prevent the photodetection elements 32 from being affected by moisture and oxygen and degrading the performance.

Coverage of the entire element-formed surface 31a with the moisture barrier layer 5 blocks passage of air between the scintillator board 2 and the photoelectric conversion panel 3. Accordingly, degradation of the phosphor layer 22 and the photodetection elements 32 can further be prevented.

Note that the moisture barrier layer 5 may be a lamination of resin film (not only PET used for the support layer 21 and the support board 31 but also polyimide (PI), polyethylene naphthalate (PEN), polypropylene (PP), etc.). According to this configuration, the moisture barrier layer 5 becomes resistant to being broken, and can improve handling.

In the thus configured radiographic imaging apparatus 100 according to this embodiment, the pressure in an area encircled by the moisture barrier layer 5 and at least one of the photoelectric conversion panel 3 and the scintillator board 2 may be lower than the atmospheric pressure.

In the radiographic imaging apparatus 100 according to this embodiment, an area encircled by the side surface of the scintillator board 2, the periphery of the element-formed surface 31a, and the moisture barrier layer 5 may be an air gap 9.

Accordingly, when the scintillator board 2 and the photoelectric conversion panel 3 are warped, the moisture barrier layer 5 can be deformed in conformity with the warp. The moisture barrier layer 5 is thus resistant to being separated.

The volume of the air gap 9 according to this embodiment in a range from 0.5% to 3% of the volume of the scintillator board 2.

The air gap 9 is configured to have a volume of at least 0.1% or more, which can smoothly arrange the moisture barrier layer 5, and prevent the moisture barrier layer 5 from being broken. The air gap 9 is configured to have a volume of 1% or less, which can save the inner space of the housing 1, and prevent the size of the housing 1 from increasing.

Figure 6:
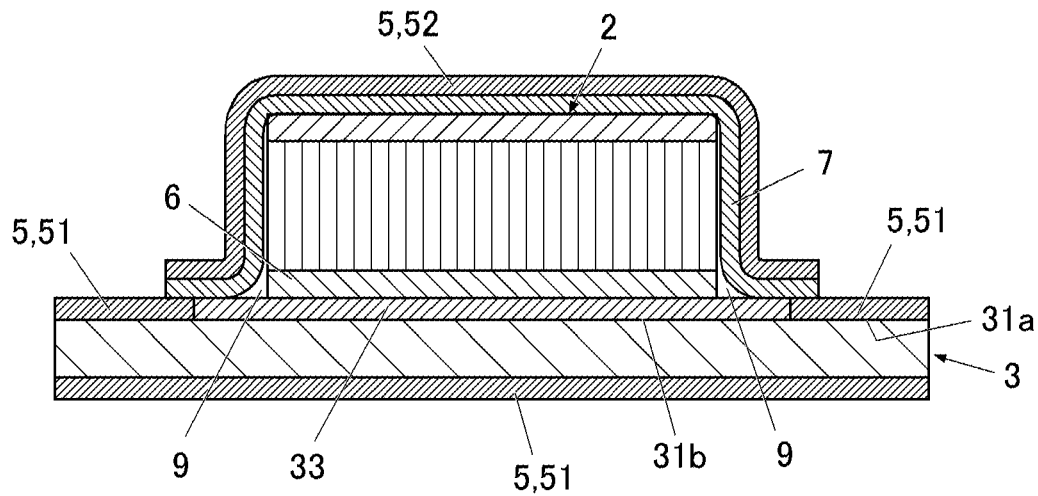
FIG. 6 is a sectional view of a partial configuration that a radiographic imaging apparatus according to a modified example of the first embodiment has.

In the radiographic imaging apparatus 100, for example, as shown in FIG. 6, the photoelectric conversion panel 3 may have an element protection layer 33 that covers the center part of the element-formed surface 31a, i.e., the element-formed area 31b.

Preferably, the element protection layer 33 is formed of an organic material.

The organic material of which the element protection layer 33 is formed may be, for example, any of polymethylmethacrylate (PMMA), fluororesin, polyvinyl alcohol (PVA), polyvinylidene chloride (PVDC), polymethacrylonitrile (PMAN), polyacrylonitrile (PAN), poly lactic-co-glycolic acid (PLGA) and the like.

In this case, the first moisture barrier layer 51 may cover the periphery of the element-formed surface 31a of the photoelectric conversion panel 3, that is, an area that is not covered with the element protection layer 33.

In this case, it is preferable that the ends of the second moisture barrier layer 52 be in a state of adhering to the photoelectric conversion panel 3 so as to be laid over the first moisture barrier layer 51 and the element protection layer 33.

Acrylic, urethane series, or another polymer-based adhesive may be mainly used as adhesive that bonds the second moisture barrier layer 52 and the element protection layer 33 to each other. In this case, the element protection layer 33 formed of the organic material as described above has a surface free energy similar to that of the adhesive. Accordingly, the wettability is increased, which improves the adhesive force therebetween.

In a case where both the adhesive and the element protection layer 33 are made of inorganic materials, the bond between hydroxy groups on the material surfaces, the hydrogen bond and the like also exert. Accordingly, it is believed that the adhesive force is further improved in comparison with a case where one of them is not made of an organic material.

As shown in FIG. 6, the radiographic imaging apparatus 100 may include an optical adhesive layer 6 that bonds the photoelectric conversion panel 3 and the scintillator board 2 to each other.

The optical adhesive layer 6 is an optical adhesive that intervenes between the photoelectric conversion panel 3 and the scintillator board 2 and bonds them.

The optical adhesive may be, for example, a thermoplastic resin or the like containing olefin series, amide series, ester series, styrene series, acrylic, urethane series, vinyl series, polycarbonate, or ABS resin (acrylonitrile-butadiene-styrene copolymer resin), as a principal component.

The optical adhesive layer 6 is thus formed of the material as described above. Accordingly, this layer has a refractive index higher than the element protection layer 33 and lower than the scintillator board 2. Accordingly, the luminance of the radiograph, and MTF (Modulated Transfer Function) can be improved.

Preferably, the thickness of the optical adhesive layer 6 is 15 μm or more (more preferably, in a range from 15 to 100 μm).

The phosphor layer 22 of the scintillator board 2 has defects on the surface (irregularities of heights or depths about 10 μm) in some cases. Such possible defects affect a radiograph to be generated. However, the optical adhesive layer 6 according to this embodiment has such a thickness, which can mask such defects and prevent the radiograph to be generated from being affected by the defects.

If the optical adhesive layer 6 is too thick, the sharpness of the generated radiograph is largely degraded. However, the upper limit of the thickness is provided to be 100 μm, which can prevent the degradation.

Preferably, the optical adhesive layer 6 is a mixture containing at least one of filler (alumina, silica, etc.) and a thermosetting resin (epoxy resin, phenol resin, etc.).

Accordingly, the optical adhesive layer 6 according to this embodiment has a thermal expansion rate of 0.2% or lower, in a range from −20 to 60° C.

Each component of the radiographic imaging apparatus 100 increases in temperature and expands, as images are taken. At this time, if the optical adhesive layer 6 relatively becomes larger than the photoelectric conversion panel 3, netlike unevenness occurs in the generated radiograph. However, the optical adhesive layer 6 according to this embodiment has a low thermal expansion rate as described above, which can prevent the generated radiograph from having unevenness.

As shown in FIG. 6, the radiographic imaging apparatus 100 may include an adhesive material 7 that bonds the moisture barrier layer 5 to at least the photoelectric conversion panel 3.

The adhesive material 7 is adhesive that intervenes between the moisture barrier layer 5 and at least the photoelectric conversion panel 3, and is made of an organic material.

The organic material constituting the adhesive material 7 may be any of acrylic, urethane series, polyester series, styrene-isoprene-styrene-block copolymer, natural rubber, butyl rubber, epoxy and the like.

The adhesive material 7 is formed of the material as described above, thereby having elasticity. Specifically, the adhesive material 7 has a shear modulus that satisfies the following expression (1).

$$\text{Shear modulus} < \text{adhesive force (shear stress) between moisture barrier layer 5 and scintillator board 2 (or photoelectric conversion panel 3)}/400 \quad (1)$$

Accordingly, the moisture barrier layer 5 and the scintillator board 2 or the photoelectric conversion panel 3 are resistant to being separated, even if the photoelectric conversion panel 3 is warped.

Preferably, the adhesive material 7 is formed to have a sheet shape having irregularities on the surface. Specifically, the arithmetical mean roughness (Ra) on the surface is in a range from 1.5 to 20 μm.

Figure 7A:
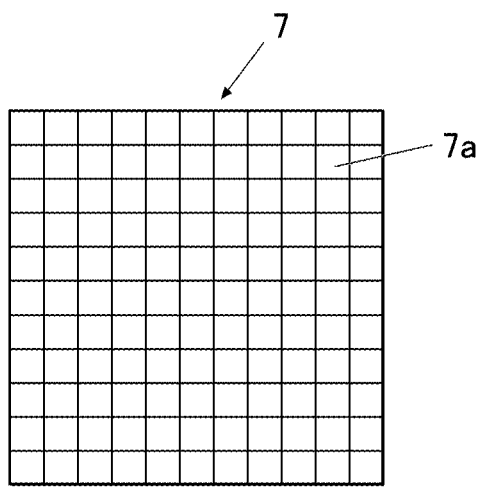
FIG. 7A and FIG. 7B are plan views of adhesive materials that the radiographic imaging apparatus in FIG. 6 has.
Figure 7B:
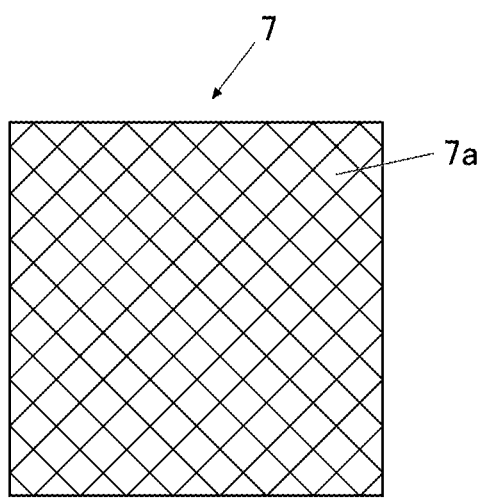

Preferably, the adhesive material 7 has openings 7a. Specifically, for example, as shown in FIGS. 7A and 7B, the material is formed to have a gridlike or netlike shape. Such a configuration makes the adhesive material 7 deformable. Accordingly, the moisture barrier layer 5 and the scintillator board 2 or the photoelectric conversion panel 3 are resistant to being separated, even if the photoelectric conversion panel 3 is warped.

Figure 8:
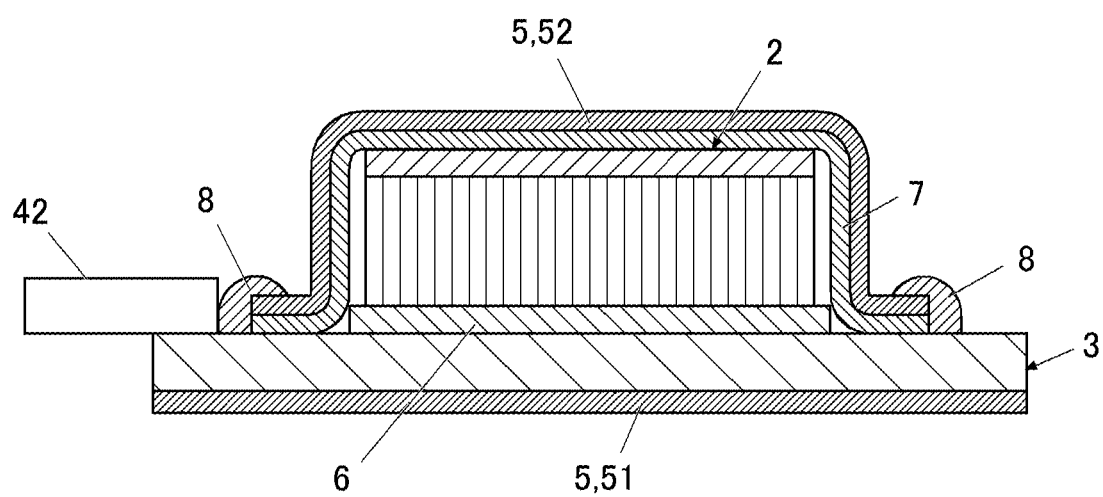
FIG. 8 is a sectional view of a partial configuration that a radiographic imaging apparatus according to a modified example of the first embodiment has.

For example, as shown in FIG. 8, the radiographic imaging apparatus 100 may include a blocking material 8 that blocks the end of the moisture barrier layer 5 and the surface of the photoelectric conversion panel 3.

Preferably, the blocking material 8 is made of a resin having characteristics of being elastic and preventing moisture from passing therethrough.

The resin of which the blocking material 8 is formed may be the same resin of which the adhesive material 7 is formed, for example.

Accordingly, the scintillator board 2 and the photoelectric conversion panel 3 are further securely blocked from the ambient air. Consequently, the phosphor layer 22 and the photodetection elements 32 are further prevented from deteriorating.

The radiographic imaging apparatus 100 according to this embodiment has the configuration, which has thus been described above. Accordingly, even if the photoelectric conversion panel 3 is warped with usage, the components (the scintillator board 2 and the moisture barrier layer 5, the photoelectric conversion panel 3 and the moisture barrier layer 5, and the scintillator board 2 and the photoelectric conversion panel 3) can be prevented from causing wrinkles and separation.

[Method of Manufacturing Radiographic Imaging Apparatus]

Next, a method of manufacturing the radiographic imaging apparatus 100 is described.

First, each of the components constituting the radiographic imaging apparatus 100 is manufactured.

The scintillator board 2 is manufactured by vacuum-depositing phosphors on the surface of the support layer 21 to achieve a predetermined thickness. When the phosphors are deposited to achieve the predetermined thickness, the phosphor layer 22 is formed.

The photoelectric conversion panel 3 is manufactured by forming the photodetection elements 32 on the surface of the support board 31. When the photoelectric conversion panel 3 is manufactured, the element-formed area 31b may be covered with the element protection layer 33, if necessary.

Note that the moisture barrier layer 5 may be preliminarily laminated on the resin film in order to improve handling during assembly described later.

After these components are manufactured, they are assembled. This step may be performed before or after the control board 4 (wires 42) is attached to the photoelectric conversion panel 3.

First, the photoelectric conversion panel 3 is covered with the first moisture barrier layer 51. The range of coverage may be only the surface 3a of the photoelectric conversion panel 3 opposite to the element-formed surface as shown in FIG. 4, or may further include the surface 2a of the scintillator board 2 opposite to the surface facing the photodetection elements 32, and the side surface 2b of the scintillator board 2 as shown in FIG. 5.

Preferably, the site of the first moisture barrier layer 51 that covers the element-formed surface 31a is formed using application (bar coat, spin coat, etc.), or a dry film formation method, such as sputtering or vacuum deposition. Meanwhile, sites of the first moisture barrier layer 51 that cover those other than the element-formed surface 31a may be formed by lamination with the sheet-shaped first moisture barrier layer 51.

Note that what does not cover the element-formed area 31b (an opening is formed) may be adopted as the first moisture barrier layer 51, and after coverage with the first moisture barrier layer 51, the element protection layer 33 may be formed in the element-formed area 31b.

Next, the scintillator board 2 is laminated on the element-formed area 31b. Furthermore, the second moisture barrier layer 52 is laminated on the scintillator board 2. They are compressively bonded to each other using a device or jig capable of thermocompressively bonding (for example, a laminator, vacuum laminator, etc.).

The compressively bonding is performed with the pressure around each component (in the apparatus) being reduced. Preferably, in this case, the pressure is about 1000 hPa, and the temperature ranges from 60 to 120° C. Accordingly, the pressure in the area encircled by the moisture barrier layer 5 and at least one of the photoelectric conversion panel 3 and the scintillator board 2 is lower than the atmospheric pressure.

Note that for lamination of the scintillator board 2 on the element-formed area 31b, a sheet-shaped optical adhesive may be pasted on the surface of the element-formed area 31b, and then the scintillator board 2 may be laminated, if necessary. Accordingly, after compressively bonding, the optical adhesive layer 6 is formed between the photoelectric conversion panel 3 and the scintillator board 2, and the photoelectric conversion panel 3 and the scintillator board 2 adhere to each other. During compressively bonding, a pressure is applied to the optical adhesive, and the adhesive force between the photoelectric conversion panel 3 and the scintillator board 2 is improved.

In this case, if the thickness of the optical adhesive is in a range from 15 to 100 μm, deposition defects of the phosphor layer 22 (about 10 μm in depth) can be masked, and air is prevented from remaining between the scintillator board 2 and the photoelectric conversion panel 3 during pasting.

For lamination of the second moisture barrier layer 52 on the surface of the scintillator board 2, a sheet-shaped adhesive may be pasted on the surface of the scintillator board 2 and the periphery of the element-formed surface 31a of the photoelectric conversion panel 3, and then the second moisture barrier layer 52 may be laminated, if necessary. Accordingly, after compressively bonding, the adhesive material 7 is formed between the scintillator board 2 and the second moisture barrier layer 52 and between the periphery of the element-formed surface 31a and the second moisture barrier layer 52, and thus the scintillator board 2 and the photoelectric conversion panel 3, and the second moisture barrier layer 52 adhere to each other. During compressively bonding, a pressure is applied to the adhesive, and the adhesive force between the scintillator board 2 and photoelectric conversion panel 3 and the second moisture barrier layer 52 is improved.

After compressively bonding, the end of the moisture barrier layer 5 and the surface of the photoelectric conversion panel 3 may be blocked by the blocking material 8, if necessary.

After compressively bonding, the control board 4 is attached to the laminated body of components; they are stored in the housing 1.

The radiographic imaging apparatus 100 is thus manufactured.

Second Embodiment

Next, a second embodiment of the present invention is described. Note that in this embodiment, configuration elements similar to those in the first embodiment are assigned the same symbols, and description thereof is omitted.

Figure 9:
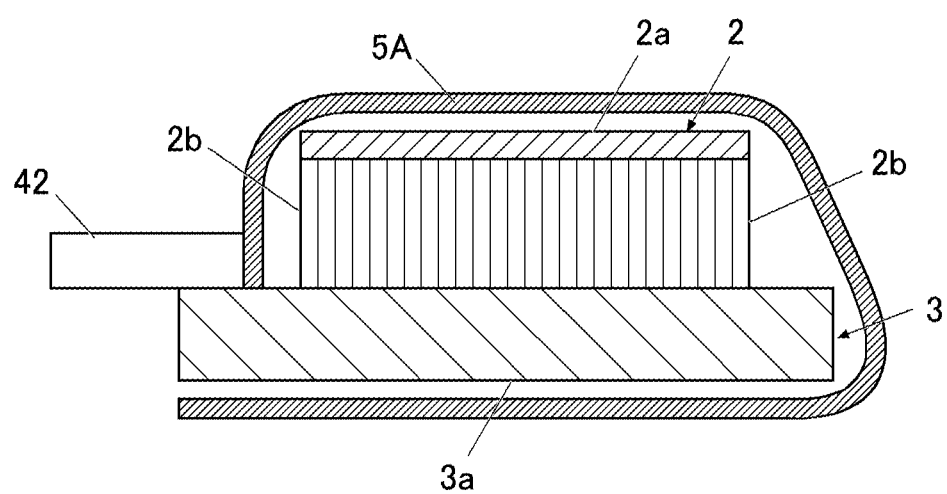
FIG. 9 is a sectional view of a partial configuration that a radiographic imaging apparatus according to a second embodiment has.

In the radiographic imaging apparatus 100 according to the first embodiment, the moisture barrier layer 5 that covers the surface of the scintillator board 2 opposite to the surface facing the photodetection elements 32 and the side surface of the scintillator board 2, and the moisture barrier layer 5 that covers the surface of the photoelectric conversion panel 3 opposite to the element-formed surface 31a, are separated as the first moisture barrier layer 51 and the second moisture barrier layer 52. However, for example, as shown in FIG. 9, in a radiographic imaging apparatus 100A according to this embodiment, the surface of the scintillator board 2 opposite to the surface facing the photodetection elements 32, at least one surface of the four side surfaces of the scintillator board 2, and the surface of the photoelectric conversion panel 3 opposite to the element-formed surface 31a is covered with one moisture barrier layer 5A.

Note that the element-formed surface 31a of the photoelectric conversion panel 3 may be covered with a third moisture barrier layer that is different from the moisture barrier layer 5A and is not shown.

The photoelectric conversion panel 3 may include the element protection layer 33.

The radiographic imaging apparatus 100A may include at least any of the optical adhesive layer 6, the adhesive material 7 and the blocking material 8.

Figure 10:
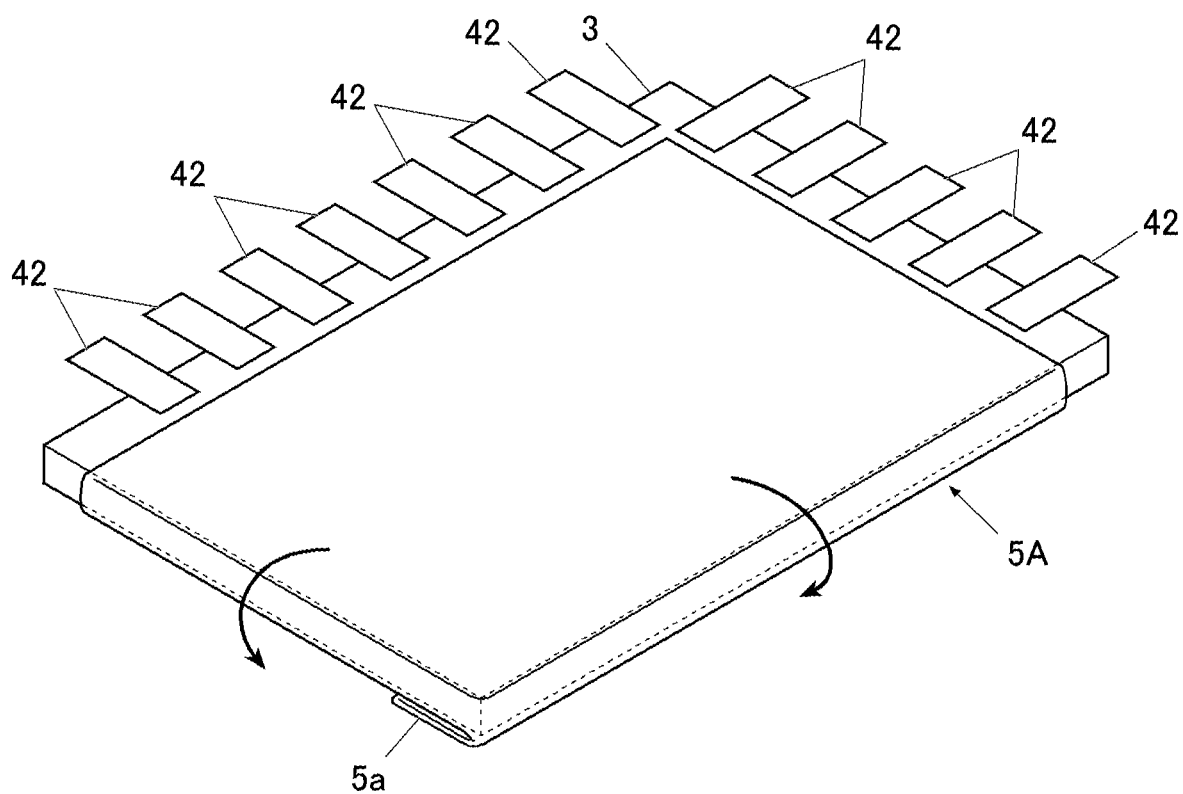
FIG. 10 is a sectional view of a partial configuration that a radiographic imaging apparatus according to a modified example of the second embodiment has.

For example, as shown in FIG. 10, after the surface of the scintillator board 2 opposite to the surface facing the photodetection elements 32, one side surface of the scintillator board 2, and the surface of the photoelectric conversion panel 3 opposite to the element-formed surface 31a are covered, a site 5a protruding from the photoelectric conversion panel 3 (a site disposed near or away in FIG. 9) may be bent in a direction where the surface of the photoelectric conversion panel 3 opposite to the element-formed surface 31a faces, thereby bringing the state into a state where the surface of the scintillator board 2 opposite to the surface facing the photodetection elements 32, at least two surfaces of the four side surfaces of the scintillator board 2, and the surface of the photoelectric conversion panel 3 opposite to the element-formed surface 31a is covered with the single moisture barrier layer 5.

The radiographic imaging apparatus 100A according to this embodiment has the configuration, which has thus been described above. Accordingly, similar to the radiographic imaging apparatus 100 according to the first embodiment, even if the photoelectric conversion panel 3 is warped with usage, the components (the scintillator board 2 and the moisture barrier layer 5, the photoelectric conversion panel 3 and the moisture barrier layer 5, and the scintillator board 2 and the photoelectric conversion panel 3) can be prevented from causing wrinkles and separation.

The present invention has thus been described above based on the embodiments. It is, however, a matter of course that the present invention is not limited to the embodiments and modified examples described above, and can be appropriately changed unless departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiographic imaging apparatus, comprising:
a planar-shaped flexible scintillator board that emits light at an intensity according to a radiation dose of received radiation;
a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and
a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface;
wherein a periphery of the element-formed surface does not face the scintillator board,
ends of wires connecting the photodetection elements to an electronic component are connected to a part of the periphery of the element-formed surface, and
the moisture barrier layer further covers a part of the periphery of the element-formed surface, the part being not in contact with the wires; and
an adhesive material that bonds the moisture barrier layer to at least the photoelectric conversion panel,
wherein on the photoelectric conversion panel, the photodetection elements are formed in a center part of the element-formed surface,
the photoelectric conversion panel includes an element protection layer that covers the center part of the element-formed surface, and
the moisture barrier layer includes:
a first moisture barrier layer that covers at least the periphery of the element-formed surface; and a second moisture barrier layer that covers the surface of the scintillator board opposite to a surface facing the photodetection elements, and the side surface of the scintillator board, and an end of the second moisture barrier layer adheres to the photoelectric conversion panel so as to be laid over the first moisture barrier layer and the element protection layer.

2. The radiographic imaging apparatus according to claim 1, wherein the moisture barrier layer further covers the element-formed surface and a side surface of the photoelectric conversion panel.

3. The radiographic imaging apparatus according to claim 1, wherein the adhesive material is formed to have a sheet shape having irregularities on a surface.

4. The radiographic imaging apparatus according to claim 1, wherein the adhesive material has elasticity.

5. The radiographic imaging apparatus according to claim 1, wherein the adhesive material has an opening.

6. The radiographic imaging apparatus according to claim 1, wherein a pressure in an area encircled by the moisture barrier layer and at least one of the photoelectric conversion panel and the scintillator board is lower than an atmospheric pressure.

7. The radiographic imaging apparatus according to claim 1, wherein the moisture barrier layer is formed of a material having conductivity, and is grounded.

8. The radiographic imaging apparatus according to claim 1, further comprising a blocking material that is made of a resin having characteristics of being elastic and preventing moisture from passing therethrough, and blocks an end of the moisture barrier layer and a surface of the photoelectric conversion panel.

9. The radiographic imaging apparatus according to claim 1, wherein an area encircled by the side surface of the scintillator board, a periphery of the element-formed surface, and the moisture barrier layer is an air gap.

10. The radiographic imaging apparatus according to claim 9, wherein a volume of the air gap is in a range from 0.5 to 3% of a volume of the scintillator board.

11. The radiographic imaging apparatus according to claim 1, further comprising an optical adhesive layer that has a refractive index higher than the element protection layer and lower than the scintillator board, and bonds the photoelectric conversion panel and the scintillator board to each other.

12. The radiographic imaging apparatus according to claim 11, wherein a thickness of the optical adhesive layer is equal to or larger than 15 μm.

13. The radiographic imaging apparatus according to claim 11, wherein a thermal expansion rate of the optical adhesive layer is equal to or lower than 0.2% in a range from −20 to 60° C.

14. A radiographic imaging apparatus, comprising:
a planar-shaped flexible scintillator board that emits light at an intensity according to a radiation dose of received radiation;
a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and
a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface,
wherein the scintillator board includes:
a planer-shaped support layer; and
a phosphor layer that is formed on a surface of the support layer, and emits light at an intensity according to a radiation dose of the received radiation, and
a thermal expansion rate of the support layer is equal to a thermal expansion rate of the support board.

15. The radiographic imaging apparatus according to claim 14, wherein an entire thickness of the phosphor layer is uniform.

16. A radiographic imaging apparatus, comprising:
a planar-shaped flexible scintillator board that emits light at an intensity according to a radiation dose of received radiation;
a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and
a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface,
wherein the photoelectric conversion panel and the scintillator board are formed to have rectangular shapes, and
the surface of the scintillator board opposite to the surface facing the photodetection elements, at least one surface of four side surfaces of the scintillator board, and the surface of the photoelectric conversion panel opposite to the element-formed surface is covered by one moisture barrier layer.

17. The radiographic imaging apparatus according to claim 16, wherein the surface of the scintillator board opposite to the surface facing the photodetection elements, at least two surfaces of four side surfaces of the scintillator board, and the surface of the photoelectric conversion panel opposite to the element-formed surface is covered by one moisture barrier layer.

18. A radiographic imaging apparatus, comprising:
a planar-shaped flexible scintillator board that emits light at an intensity according to a radiation dose of received radiation;
a flexible photoelectric conversion panel that includes a plurality of photodetection elements formed so as to be distributed two-dimensionally on a surface of a flexible support board, and is arranged such that an element-formed surface on which the photodetection elements are formed faces the scintillator board, the photodetection elements generating charges according to an intensity of the received radiation; and
a moisture barrier layer that is formed of a material having characteristics of preventing moisture from passing therethrough, and covers a surface of the scintillator board opposite to a surface facing the photodetection elements, a side surface of the scintillator board, and a surface of the photoelectric conversion panel opposite to the element-formed surface, wherein the scintillator board includes:
  a planer-shaped support layer; and
  a phosphor layer that is formed on a surface of the support layer, and emits light at an intensity according to a radiation dose of the received radiation, and a thermal contraction rate of the support layer is equal to a thermal contraction rate of the support board.

\* \* \* \* \*